(12) United States Patent
Matoba

(10) Patent No.: US 11,022,570 B2
(45) Date of Patent: Jun. 1, 2021

(54) X-RAY TRANSMISSION INSPECTION APPARATUS AND X-RAY TRANSMISSION INSPECTION METHOD

(71) Applicant: HITACHI HIGH-TECH SCIENCE CORPORATION, Tokyo (JP)

(72) Inventor: Yoshiki Matoba, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 16/525,352

(22) Filed: Jul. 29, 2019

(65) Prior Publication Data

US 2020/0041425 A1 Feb. 6, 2020

(30) Foreign Application Priority Data

Aug. 3, 2018 (JP) .............................. JP2018-146481

(51) Int. Cl.
*G01N 23/04* (2018.01)
*G01N 23/044* (2018.01)
(Continued)

(52) U.S. Cl.
CPC ............. *G01N 23/18* (2013.01); *G01N 23/04* (2013.01); *G01N 23/044* (2018.02);
(Continued)

(58) Field of Classification Search
CPC .... G01N 23/04; G01N 23/044; G01N 23/046; G01N 23/06; G01N 23/083; G01N 23/087; G01N 23/18
(Continued)

(56) References Cited

U.S. PATENT DOCUMENTS 4,926,452 A * 5/1990 Baker .................. G01R 31/302
378/22
5,481,584 A * 1/1996 Tang ..................... G01N 23/083
378/98.9
(Continued)

FOREIGN PATENT DOCUMENTS

EP 0683389 A1 11/1995
JP 2013036805 A 2/2013

OTHER PUBLICATIONS

European Search Report—EP19189621—dated Feb. 17, 2020—Hitachi High-Tech Science Corporation.
(Continued)

*Primary Examiner* — Allen C. Ho

(57) ABSTRACT

An X-ray transmission inspection apparatus includes an X-ray source for irradiating a sample with X-rays, a two-dimensional sensor for detecting transmission X-rays passing through the sample, a sample moving mechanism for moving the sample, a calculation unit for processing an image of the transmission X-rays detected by the two-dimensional sensor, and a display unit for displaying a cross-sectional image. When V1 is a speed at which the sample moves, F is a frame rate of the two-dimensional sensor, A is a sample pitch of the two-dimensional sensor, and LS is a distance between the X-ray source and the two-dimensional sensor, the calculation unit creates a cross-sectional image taken at a distance L from the X-ray source by adding the images of the pixels positioned at an interval of [(LS×V2)/(L×F×A)] in a direction in which the sample moves.

8 Claims, 3 Drawing Sheets

(51) Int. Cl.
*G01N 23/046* (2018.01)
*G01N 23/06* (2018.01)
*G01N 23/083* (2018.01)
*G01N 23/087* (2018.01)
*G01N 23/18* (2018.01)

(52) U.S. Cl.
CPC ........... *G01N 23/046* (2013.01); *G01N 23/06* (2013.01); *G01N 23/083* (2013.01); *G01N 23/087* (2013.01); *G01N 2223/3306* (2013.01)

(58) Field of Classification Search
USPC ....... 378/21, 22, 25, 26, 51, 53, 54, 58, 208
See application file for complete search history.

(56) References Cited

U.S. PATENT DOCUMENTS

| | | | | |
|---|---|---|---|---|
| 5,583,904 | A * | 12/1996 | Adams | G01N 23/044 378/22 |
| 6,028,910 | A * | 2/2000 | Kirchner | G01N 23/046 378/22 |
| 6,314,201 | B1 * | 11/2001 | Roder | G01R 31/71 382/147 |
| 6,373,917 | B1 * | 4/2002 | Roder | G01N 23/044 378/22 |
| 6,862,337 | B2 | 3/2005 | Claus et al. | |
| 7,127,028 | B2 * | 10/2006 | Sendai | G01N 23/044 378/21 |
| 7,529,336 | B2 * | 5/2009 | Wen | G01N 23/046 378/26 |
| 8,031,929 | B2 * | 10/2011 | Srinivasan | G06T 7/0004 382/141 |
| 8,094,776 | B2 * | 1/2012 | Takahashi | A61B 6/484 378/21 |
| 8,184,765 | B2 * | 5/2012 | Akahori | A61B 6/469 378/4 |
| 8,223,922 | B2 * | 7/2012 | Suyama | G01N 23/087 378/98.9 |
| 8,280,005 | B2 * | 10/2012 | Suyama | G01N 23/04 378/98.9 |
| 8,509,512 | B2 * | 8/2013 | Ota | G01N 23/046 382/131 |
| 8,559,593 | B2 * | 10/2013 | Akahori | A61B 6/469 378/26 |
| 8,611,492 | B2 * | 12/2013 | Jerebko | A61B 6/025 378/37 |
| 8,675,814 | B2 * | 3/2014 | Akahori | A61B 6/469 378/26 |
| 8,705,690 | B2 * | 4/2014 | Jerebko | A61B 6/502 378/37 |
| 8,804,912 | B2 * | 8/2014 | Akahori | A61B 6/583 378/163 |
| 9,791,387 | B2 * | 10/2017 | Cheng | G01T 7/10 |
| 10,054,432 | B2 * | 8/2018 | Kasahara | G01N 23/18 |
| 2005/0213701 | A1 | 9/2005 | Sendai | |
| 2008/0298538 | A1 | 12/2008 | Wen et al. | |
| 2010/0080342 | A1 | 4/2010 | Takahashi | |

OTHER PUBLICATIONS

The Application of Digital Tomosynthesis to the CT Nondestructive Testing of Long Large Objects—Zhifeng et al. Department of Engineering Physics, Tsinghua University, Beijing, China, Proceedings of SPIE 5535,Developments in X-ray Tomography IV, Oct. 26, 2004.

* cited by examiner

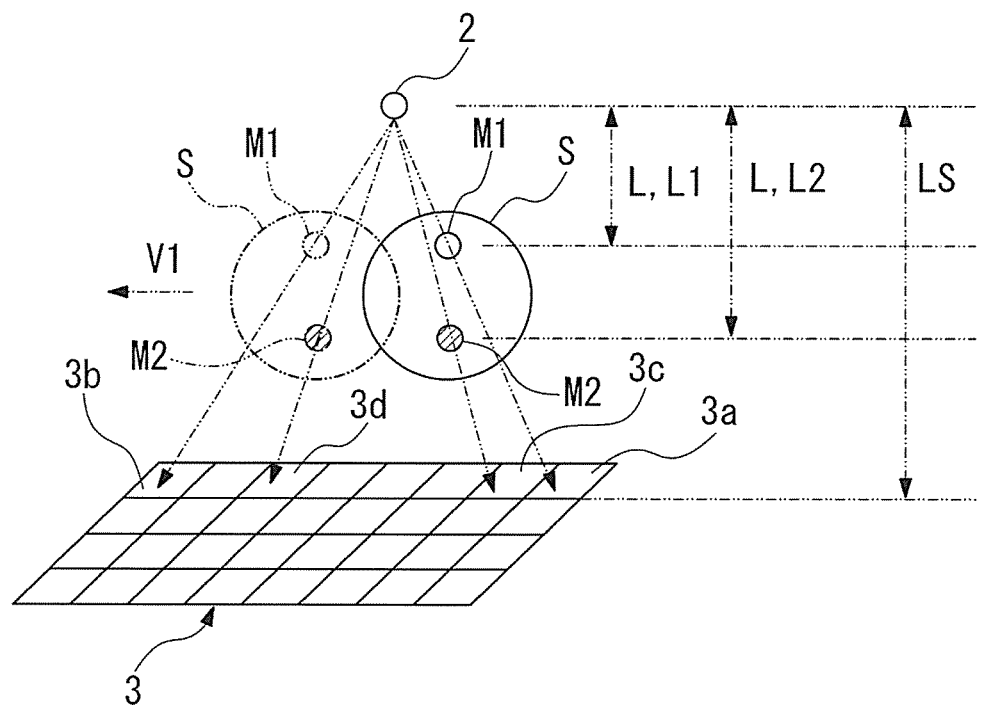
FIG. 2
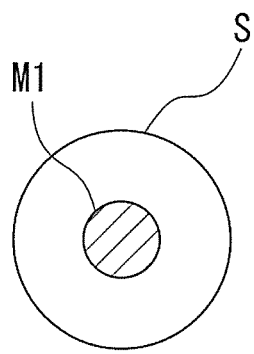 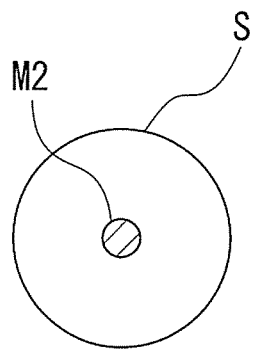
FIG. 3A FIG. 3B

X-RAY TRANSMISSION INSPECTION APPARATUS AND X-RAY TRANSMISSION INSPECTION METHOD

CROSS REFERENCE TO RELATED APPLICATION(S)

This application claims the benefit of Japanese Patent Application No. 2018-146481, filed Aug. 3, 2018, which is hereby incorporated by reference in its entirety into this application.

BACKGROUND OF THE INVENTION

1. Technical Field

The present invention relates to an X-ray transmission inspection apparatus and method capable of detecting foreign object such as a metallic particle in a sample.

2. Description of the Related Art

Generally, to detect foreign object such as a minute metal particle, in a sample, X-ray transmission inspection is carried out in which an X-ray transmission image obtained by irradiating a sample with X-rays is used.

For example, Patent Document 1 discloses a transmission X-ray analysis apparatus and method capable of measuring transmission X-rays passing through a sample using a time delay integration (TDI) sensor.

The transmission X-ray analysis apparatus detects a transmission X-ray image of a sample relatively moving in a scanning direction. The transmission X-ray analysis apparatus includes a time delay integration (TDI) sensor, a shielding member, and a shielding member position controller. The TDI sensor includes a plurality of image sensing devices that are two-dimensionally arranged and read, in a time delay integration manner, charges generated through photo-electric conversion of an image obtained from a transmission X-ray image. Specifically, the TDI sensor includes a plurality of line sensors arranged in a scan direction, thereby transferring charges accumulated in one line sensor to the another line sensor, in which each line sensor includes a plurality of image sensing devices arranged in a direction perpendicular to the scan direction. The shielding member is positioned between the TDI sensor and a sample and controlled to reciprocate in the scan direction, thereby intercepting a partial image corresponding to a predetermined number of line sensors among all the line sensors of the TDI sensor. The shielding member position controller adjusts the position of the shielding member such that the shielding member intercepts the partial image corresponding to the predetermined number of line sensors.

DOCUMENT OF RELATED ART

Patent Document

Patent Document 1) Japanese Patent Application Publication No. 2013-36805

SUMMARY OF THE INVENTION

The above-described conventional art has the problems described below.

When a time delay integration (TDI) sensor is used for transmission X-ray analysis, the depth of field (DOF) is decreased as the number of lines whose charges are to be added is increased. In the case of analyzing a thick sample, only a part of the sample will be in-focus and can be successfully imaged while the remaining part of the sample will be out-of-focus and cannot be imaged. Thus, there was an inconvenience that it is impossible to see the internal structures of the whole body of the sample. In this case, to obtain an image of the whole body of the sample, it is necessary to scan the sample several times while varying the transmission speed of the TDI sensor. Therefore, it takes much time to obtain a tomogram (cross-sectional images at various heights).

An object of the present invention is to provide an X-ray transmission inspection apparatus and an X-ray transmission inspection method capable of rapidly obtaining cross-sectional images of a sample at various heights of the sample.

In order to solve the problems described above, the present invention employs the constructions described below. According to a first aspect of the present invention, an X-ray transmission inspection apparatus includes: an X-ray source for irradiating a sample with X-rays; a two-dimensional sensor for detecting transmission X-rays passing through the sample, the two-dimensional sensor being disposed on the opposite side of the X-ray source with the sample placed therebetween; a moving mechanism for moving the sample at a predetermined speed in a predetermined direction parallel to a detection surface of the two-dimensional sensor; and a calculation unit for processing an image of the transmission X-rays detected by the two-dimensional sensor, wherein the two-dimensional sensor includes a plurality of pixels which are image sensing devices arranged in a lattice pattern and reads out images detected by all of the pixels through a single read operation at a constant frame rate, and the calculation unit creates a cross-sectional image of the sample at a position having a distance of L from the X-ray source by performing an addition process of cumulatively adding the images of pixels positioned at an interval of $[(LS \times V1)/(L \times F \times A)]$ in the direction in which the sample moves where V1 is the speed at which the sample moves, F is the frame rate, A is a pixel pitch of the two-dimensional sensor, and LS is a distance between the X-ray source and the two-dimensional sensor.

In the X-ray transmission inspection apparatus, since the calculation unit creates the cross-sectional image of the sample at the position having a distance of L from the X-ray source by cumulatively adding the images of the pixels spaced from each other by an interval of $[(LS \times V1)/(L \times F \times A)]$ in the direction in which the sample moves where V1 is the speed at which the sample moves, F is the frame rate, A is the pixel pitch of the two-dimensional sensor, and LS is the distance between the X-ray source and the two-dimensional sensor, it is possible to obtain a cross-sectional image at an arbitrary position having a distance of L by integrating the images of the pixels arranged in the direction in which the sample moves and spaced from each other by an interval calculated by using a rule of $[(LS \times V1)/(L \times F \times A)]$ depending on the movement speed of the sample and the frame rate. In addition, it is possible to obtain an image with high sensitivity by adding images of a plurality of pixels. Therefore, it is possible to obtain a three-dimensional X-ray image of the whole body of the sample through a single read operation by performing the addition process according to the above-described rule when obtaining each of a plurality of cross-sectional images taken at different positions while varying the distance of L.

According to a second aspect of the present invention, in the X-ray transmission inspection apparatus of the first aspect, when creating and displaying a first cross-sectional image of the sample at a position having a distance of L1 from the X-ray source and a second cross-sectional image of the sample at a position having a distance L2 from the X-ray source on the display unit, the calculation unit performs a correction process of increasing or decreasing a size of the first cross-sectional image L1/L2 times so that the resulting image is displayed on the display unit.

That is, in this X-ray transmission inspection apparatus, when creating the first cross-sectional image of the sample at the position having a distance of L1 from the X-ray source and the second cross-sectional image of the sample at the position having a distance of L2 from the X-ray source and displaying the first and second cross-sectional images on the display unit, the calculation unit performs the correction process of adjusting the size of the first cross-sectional image to be displayed on the display unit with a ratio of L1/L2. Therefore, the first cross-sectional image having the adjusted size is displayed on the display unit. Since, one of the cross-sectional images taken from different positions is adjusted to have the same size as the other cross-sectional image, the cross-sectional images having the same size can be displayed. Therefore, it is possible to compare the sizes of the foreign objects located at different positions in the sample by comparing the cross-sectional images taken from different positions.

According to a third aspect of the present invention, the X-ray transmission inspection apparatus according to the first or second aspect may further include a sample rotating mechanism for changing orientation of the sample with respect to the X-ray source such that the calculation unit produces a plurality of cross-sectional images taken from different directions by changing the orientation of the sample with the sample rotating mechanism.

That is, in the X-ray transmission inspection apparatus, the sample rotating mechanism changes the orientation of the sample so that the calculation unit can produce multiple cross-sectional images of the sample taken from different directions. Therefore, in case where a foreign object does not appear in a certain cross-sectional image due to the presence of an X-ray shielding object in the sample, since multiple cross-sectional images of the sample are taken from different directions, it is possible to obtain a cross-sectional image in which the foreign object appears without being interfered by the X-ray shielding object.

According to a fourth aspect of the present invention, an X-ray transmission inspection method includes: irradiating a sample with X-rays using an X-ray source; detecting transmission X-rays passing through the sample using a two-dimensional sensor provided on the opposite side of the X-ray source with the sample placed therebetween; moving the sample at a predetermined speed in a predetermined direction parallel to a detection surface of the two-dimensional sensor; performing calculation on an image of the transmission X-rays detected by the two-dimensional sensor; and displaying a cross-sectional image generated from the image through calculation of the calculation unit, wherein the two-dimensional sensor includes a plurality of pixels which are image sensing devices arranged in a lattice pattern and reads out the images detected by all of the pixels through a single read operation at a predetermined frame rate, and wherein the performing of the calculation creates a cross-sectional image of the sample at a position having a distance of L from the X-ray source through an addition process of cumulatively adding the images of pixels positioned at an interval of $[(LS \times V1)/(L \times F \times A)]$ in the direction in which the sample moves wherein V1 is the speed at which the sample moves, F is the frame rate, A is a pixel pitch of the two-dimensional sensor, and LS is a distance between the X-ray source and the two-dimensional sensor.

According to a fifth aspect of the present invention, in the X-ray transmission inspection method according to the fourth aspect of the invention, the performing of the calculation includes a correction process of creating a first cross-sectional image of the sample at a position having a distance of L1 from the X-ray source and a second cross-sectional image of the sample at a position having a distance of L2 from the X-ray source and displaying the first and second cross-sectional images on a display unit after increasing or decreasing a size of the first cross-sectional image L1/L2 times.

According to a sixth aspect of the present invention, in the X-ray transmission inspection method according to the fourth or fifth aspect of the present invention, the performing of the calculation creates multiple cross-sectional images by irradiating the sample with the X-rays from multiple directions by changing orientation of the sample with respect to the X-ray source.

The present invention has the advantages described below.

According to the X-ray transmission inspection apparatus and the X-ray transmission inspection method according to the present invention, since the addition process of adding the images of the pixels arranged in the direction in which the sample moves at an interval of $(LS \times V1)/(L \times F \times A)$ is performed to create a cross-sectional image taken at a position having a distance of L from the X-ray source, it is possible to obtain a three-dimensional X-ray image of the entire body of the sample through a single scan operation, wherein V1 is the speed at which the sample moves, F is the frame rate, A is a pixel pitch of the two-dimensional sensor, and LS is a distance between the X-ray source and the two-dimensional sensor.

Therefore, the X-ray transmission inspection apparatus and the X-ray transmission inspection method according to the present invention can be used for an X-ray CT scan capable of rapidly acquiring cross-sectional images of a sample at various heights.

BRIEF DESCRIPTION OF THE DRAWINGS

The above and other objects, features and other advantages of the present disclosure will be more clearly understood from the following detailed description taken in conjunction with the accompanying drawings, in which:

FIG. 2 is an explanatory view illustrating the X-ray transmission inspection method according to the first embodiment;

FIG. 3A to FIG. 3D are diagrams illustrating an original cross-sectional image and a corrected cross-sectional image used in the X-tray transmission inspection method according to the first embodiment.

DESCRIPTION OF THE PREFERRED EMBODIMENTS

Hereinafter, an X-ray transmission inspection apparatus and an X-ray transmission inspection method according to a first embodiment of the present invention will be described with reference to FIGS. 1 through 3.

Figure 1:
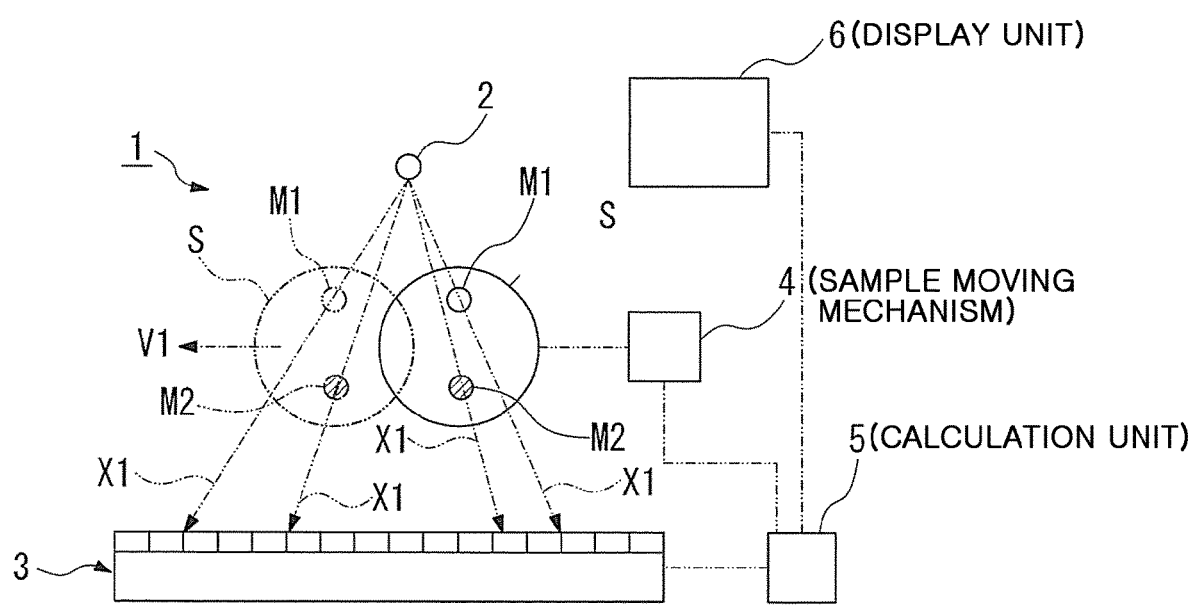
FIG. 1 is a schematic view illustrating the overall construction of an X-ray transmission inspection apparatus and an X-ray transmission inspection method according to a first embodiment of the present invention.

As illustrated in FIG. 1, an X-ray transmission inspection apparatus 1 according to a first embodiment of the present embodiment includes an X-ray source 2 for irradiating a sample S with transmission X-rays X1, a two-dimensional sensor 3 installed on the opposite side of the X-ray source 2 with the sample S placed therebetween and configured to detect transmission X-rays X1 passing through the sample S, a sample moving mechanism 4 for moving the sample S at a predetermined speed in a predetermined direction parallel to a detection surface of the two-dimensional sensor 3, a calculation unit 5 for processing an image of the transmission X-rays X1 detected by the two-dimensional sensor 3, and a display unit 6 for displaying a cross-sectional image generated through the image processing of the calculation unit 5.

The two-dimensional sensor 3 includes a plurality of pixels $3a$, $3b$, . . . which are image sensing devices arranged in matrix. The two-dimensional sensor 3 can read all of the images detected by the plurality of pixels $3a$, $3b$ . . . at a constant frame rate through a single read operation. In the present embodiment, a CMOS sensor capable of reading the plurality of pixels $3a$, $3b$, . . . at a high frame rate through a single read operation is employed as the two-dimensional sensor 3.

The calculation unit 5 creates a cross-sectional image of the sample S taken at a position having a distance L from the X-ray source 2 by performing an addition process of cumulatively adding images (for example, output voltages or signal output values) of pixels $3a$, $3b$, $3c$, . . . positioned at an interval of $[(Ls \times V1)/(L \times F \times A)]$ and arranged in a direction in which the sample S moves, wherein V1 is the predetermined speed, F (fps) is the frame rate of the two-dimensional sensor 3, A is the pixel pitch of the two-dimensional sensor 3, and LS is the distance between the X-ray source 2 and the two-dimensional sensor 3.

The pixel pitch A is a length of one side of each pixel when the pixel is a square pixel but is a pixel pitch in the direction in which the sample S moves when the pixel is not a square pixel.

The calculation unit 5 generates a first cross-sectional image of the sample S taken at a position having a distance L1 from the X-ray source 2 and a second cross-sectional image of the sample S taken at a position having a distance L2 from the X-ray source 2 and displays the first cross-sectional image and the second cross-sectional image on the display unit 6. The calculation unit 5 has a correction function of adjusting the size of the first cross-sectional image at the time of displaying the first cross-sectional image and the second cross-sectional image on the display unit 6. Specifically, the calculation unit 5 enlarges or contracts the size of the first-cross-sectional image displayed on the display unit, L1/L2 times.

The X-ray source 2 is an X-ray tube that can emit X-rays. The X-ray source 2 is configured such that hot electrons generated from a filament (cathode) within a tube are accelerated by a voltage applied between the filament (cathode) and a target (anode) so as to collide with the target that is tungsten (W), molybdenum (Mo), chromium (Cr), or the like, thereby generating X-rays which are emitted to a window such as a beryllium foil.

The sample moving mechanism 4 may be a motor that moves the sample S in relative to the two-dimensional sensor 3 at a predetermined speed V1 in a predetermined direction parallel to the detection surface of the two-dimensional sensor 3.

The calculation unit 5 is connected to each of the X-ray source 2, the sample moving mechanism 4, the two-dimensional sensor 3, and the display unit 6. The calculation unit 5 is a computer composed of a CPU and the like. The calculation unit 5 controls those connected parts and performs a predetermined operation.

The display unit 6 is a display device such as a liquid crystal display (LCD) device. The display unit 6 displays cross-sectional images (tomography) of the sample S taken at various heights and output from the calculating unit 5 thereon.

Next, an X-ray transmission inspection method using the X-ray transmission inspection apparatus 1 of the present embodiment will be described.

The X-ray transmission inspection method of the present embodiment includes the steps of: irradiating a sample S with X-rays X1 using an X-ray source 2; detecting transmission X-rays X1 passing through the sample S using a two-dimensional sensor 3 provided on the opposite side of the X-ray source 2 with the sample S placed therebetween; moving the sample S at a predetermined speed in a predetermined direction parallel to a detection surface of the two-dimensional sensor 3; performing calculation on an image of the transmission X-rays X1 detected by the two-dimensional sensor 3; and displaying a cross-sectional image generated through the image processing on a display unit 6.

The detecting by the two-dimensional sensor 3 and the performing of the calculation are performed while moving the sample S at the predetermined speed in the predetermined direction. For example, when a foreign object M1 is present in the sample S at a position having a distance L1 from the X-ray source 2 as illustrated in FIG. 2, at an early stage of the movement of the sample S, the transmission X-rays X1 passing through the foreign object M1 enter into a pixel $3a$. Thus, the image of the foreign object M1 is read from the pixel $3a$. However, when the next frame is read from the two-dimensional sensor 3 at the frame rate F, since the sample S moves at a speed V1, the transmission X-rays X1 passing through the foreign object M1 enter into a pixel $3b$ spaced from the pixel $3a$ by a distance of $[(Ls \times V1)/(L1 \times F \times A)]$ in the direction in which the sample S moves. Thus, at this time, the image of the foreign object M1 is read from the pixel $3b$.

In the calculation step, the transmission X-rays X1 passing through the foreign object M1 in the sample S enter into the multiple pixels $3a$, $3b$, $3c$, . . . at different times depending on the frame rate F, and the multiple images read from the multiple pixels $3a$, $3b$, and $3c$, . . . are cumulatively added by the calculation unit 5. As a result, an integrated image of the foreign object M1 is obtained. The addition process is performed for other regions at the position having the distance L1 from the X-ray source 2, thereby obtaining a cross-sectional image of the sample S having the foreign object M1 therein. In addition, the calculation unit 5 causes the display unit 6 to display the cross-sectional image. Thus, the foreign object M1 appears in the cross-sectional image of the sample S taken at the position having the distance of L1 from the X-ray source 2.

On the other hand, when there is a foreign object M2 in the sample S at a position having a distance of L2 from the X-ray source 2, at an early stage of the movement of the sample S, the transmission X-rays X1 passing through the foreign object M2 enter into the pixel $3c$ so that an image of the foreign object M2 is read from the pixel $3c$. However, when the next image is read from the two-dimensional sensor 2 at a frame rate F, since the sample S moves at a speed of V1, transmission X-rays X1 passing through the foreign object M2 enter into a pixel $3d$ spaced from the pixel $3c$ by a distance of $[(LS \times V1)/(L2 \times F \times A)]$ in the direction in which the sample S moves. Thus, the image of the foreign object M2 is read from the pixel $3d$.

In the calculation step, the transmission X-rays X1 passing through the moving foreign object M2 enter into the multiple pixels $3a$, $3b$, $3c$, . . . at different times according to the frame rate F, and the multiple images read from the multiple pixels $3a$, $3b$, and $3c$, . . . are cumulatively added by the calculation unit 5. As a result, an integration operation image of the foreign object M2 is obtained. The addition process is performed for the other regions at the position having a distance of L2 from the X-ray source 2, thereby obtaining a cross-sectional image of the sample S having the foreign object M2 therein. In addition, the calculation unit 5 causes the display unit 6 to display the cross-sectional image. Thus, the foreign object M2 appears in the cross-sectional image of the sample S taken at the position having a distance of L2 from the X-ray source 2.

In this way, the addition process is performed for all the virtual slices of the sample S over the full thickness of the sample S while changing the distance from the X-ray source. Thus, it is possible to obtain the cross-sectional images of all the virtual slices of the sample S through a single scan.

It should be noted that although the decimal places are valid for the number of pixels the images of which are added in the addition process, actually, the images of the pixels added to produce a cross-sectional image are taken from only the pixels located at integer pixel positions.

For example, when the pixel interval between two consecutive frames is calculated to be 0.3 pixel according to the above-described expression, that is, when the interval between the pixel in the current frame and the pixel in the next frame (the first future frame) is 0.3 pixel, the value of the pixel in the current frame is used, as it is, as the value of the pixel in the next frame. That is, the pixel interval between the current frame and the third future frame is also less than 1 ($0.3 \times 3 = 0.9$, 0.3 pixels interval per frame). Thus, up to the third future frame, the value of the pixel in the current frame is used as it is. Thus, the value of the pixel in the current frame are added three times. However, for the fourth future frame, since the pixel interval between the current frame and the fourth future frame becomes 1.2 (that is, $0.3 \times 4 = 1.2$, 0.3 pixel per frame), the value of the next pixel is added in the addition process.

It also should be noted that when the cross-sectional images of the sample S are displayed on the display unit 6, since the cross-sectional image of the sample S taken at the position having a distance of L1 from the X-ray source 2 and the cross-sectional image of the sample S at the position having a distance of L2 from the X-ray source 2 differ in the distance to the two-dimensional sensor 3, there is a size difference between the cross-sectional images of the foreign objects M1 and M2 projected with the X-rays X1 when the cross-sectional images are not modulated.

Figure 3C:
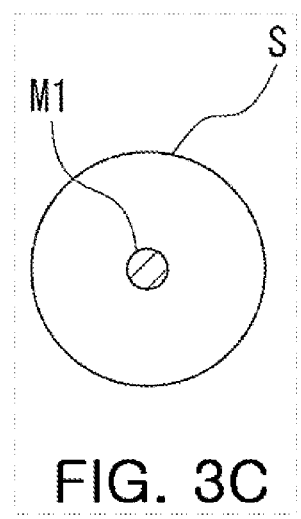
Figure 3D:
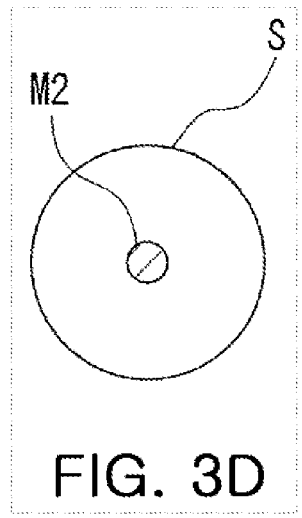

Therefore, as illustrated in FIGS. 3A and 3B, to match the sizes of the cross-sectional image (a) of the sample S at the position having a distance of L1 and the cross-sectional image (b) of the sample S at the position having a distance of L2 when the cross-sectional images (a) and (b) are displayed on the display unit 6, the calculation unit 5 performs a correction process of adjusting the displayed size of the cross-sectional image (a) of the sample S by a ratio of L1/L2, and then displays the size-adjusted cross-sectional image on the display unit 6 as illustrated in FIGS. 3C and 3D. That is, since the displayed size of the cross-sectional image (c) of the sample S taken at the position having a distance of L1 and the displayed size of the cross-sectional image (d) of the sample S taken at the position having a distance of L2 are matched with each other, in the case where the foreign object M1 and the foreign object M2 actually have the same size, the foreign objects M1 and M2 are displayed in the same size on the display unit 6.

In addition, the calculation unit 5 may three-dimensionally synthesizes the multiple cross-sectional images obtained in this manner and displays the resulting three-dimensional image on the display unit 6.

Thus, in the X-ray transmission inspection apparatus 1 and the X-ray transmission inspection method of the present embodiment, when the moving speed of the sample S is denoted by V1, the frame rate is denoted by F, the pixel pitch of the two-dimensional sensor 3 is denoted by A, and the distance between the X-ray source 2 and the two-dimensional sensor 3 is denoted by LS, a cross-sectional image of the sample at a position having a distance of L from the X-ray source is created by adding the images of the pixels $3a$, $3b$, $3c$, . . . spaced from each other by an interval of $(LS \times V1)/((LS \times V1))$ in the direction in which the sample S moves, among the pixels of the two-dimensional sensor 3. In this way, it is possible to obtain a cross-sectional image at an arbitrary distance L by adding the images of the pixels $3a$, $3b$, $3c$, . . . arranged in the direction in which the sample moves at an interval of $[(LS \times V1)/(L \times F \times A)]$ depending on the moving speed of the sample and the frame rate of the two-dimensional sensor.

In addition, it is possible to obtain an image with high sensitivity by adding the images of a plurality of pixels.

Therefore, it is possible to obtain a three-dimensional X-ray image of the entire body of the sample S through a single scan by performing the addition process for each of the cross-sectional images taken at different positions according to the above-described expression while sequentially changing the distance L, using the calculation unit 5.

When the calculation unit 5 creates a first cross-sectional image of the sample at a position having a distance of L1 from the X-ray source 2 and a second cross-sectional image of the sample at a position having a distance of L2 from the X-ray source 2 and displays the first and second cross-sectional images on the display unit 6, the calculation unit 5 has a correction function of adjusting the size of the first cross-sectional image at the time of displaying the first and second cross-sectional images on the display unit. Specifically, the calculation unit 5 enlarges or contracts the first-cross-sectional image displayed on the display unit by a ratio of L1/L2. Accordingly, although the foreign objects M1 and M2 are located at different positions in the sample S and are thus captured in different cross-sectional images, the sizes of the foreign objects M1 and M2 can be compared.

Next, an X-ray transmission inspection apparatus and an X-ray transmission inspection method according to a second embodiment of the present invention will be described with reference to FIG. 4. Hereinbelow, in describing the second embodiment of the present invention, like elements in the first and second embodiments are denoted by like reference numerals, and a redundant description will be avoided.

The second embodiment differs from the first embodiment in a point that the X-ray transmission inspection apparatus 1 according to the first embodiment includes the sample moving mechanism 4 that moves the sample S in a predetermined direction but an X-ray transmission inspection apparatus 21 according to the second embodiment of the present invention includes a sample rotating mechanism 24 that changes orientation of a sample S with respect to an X-ray source 2.

According to the second embodiment, a calculation unit 5 has a function of creating multiple cross-sectional images of the sample S from measurements of X-rays X1 transmitted through the sample S which is irradiated from different directions by changing the orientation of the sample S multiple times using the sample rotating mechanism 24.

The sample rotating mechanism 24 includes, for example, a stepping motor and the like. The sample rotating mechanism 24 changes the orientation of the sample S so as to be perpendicular to the direction in which the sample S moves or tilts the sample S by a predetermined angle with respect to an axis parallel to the detection surface of a two-dimensional sensor 3.

Figure 4:
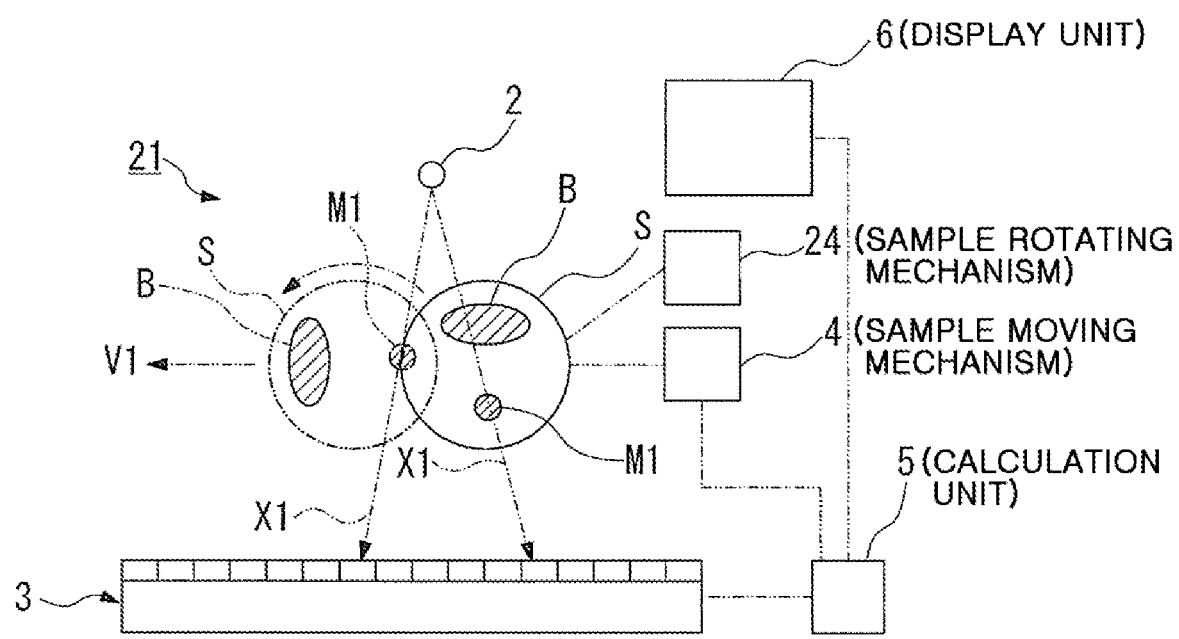
FIG. 4 is a schematic view illustrating the overall construction of an X-ray transmission inspection apparatus and an X-tray transmission inspection method according to a second embodiment of the present invention.

For example, as illustrated in FIG. 4, when an X-ray shielding object B having a relatively large size exists in the sample S and a foreign object M1 is located immediately beneath the X-ray shielding object B, it is difficult to detect the foreign object M1 through a single scan because the foreign object M1 is hidden under the X-ray shielding object B.

Therefore, according to the second embodiment, the first scan of the sample S is performed to obtain a first overall cross-sectional image of the sample S, then the sample S is tilted by the sample rotating mechanism 24 so that the sample S is positioned to be orthogonal to the direction in which the sample S moves or tilted, for example by 90° with respect to an axis parallel to the detection surface of the two-dimensional sensor 3, and then the second scan of the sample S is performed to obtain a second overall cross-sectional image of the sample S.

The calculation unit 5 three-dimensionally synthesizes the multiple cross-sectional images obtained in this manner and displays the resulting three-dimensional image on the display unit 6.

With this method, the foreign object M1 that is hidden under the X-ray shielding object B1 and is thus not imaged by the first scan can be imaged by the second scan which is performed after rotating the sample S.

The tilt angle of the sample S is arbitrary. The tilt angle may be adjusted multiple times. The scan may be performed whenever the tilt angle of the sample S is changed.

According to the X-ray transmission inspection apparatus 21 and the X-ray transmission inspection method according to the second embodiment, since multiple X-ray transmission cross-sectional images of the sample S are obtained by changing the orientation of the sample S multiple times, even in the case where the foreign object M1 is hidden under the X-ray shielding object B in the sample S, it is possible to obtain a cross-sectional image in which the foreign object M1 appears.

The technical scope of the prese is not limited to the individual embodiments described above, and changes, alterations, and modifications to the embodiments are possible without departing from the spirit of the present invention.

What is claimed is:

1. An X-ray transmission inspection apparatus comprising:
    an X-ray source configured to irradiate a sample with X-rays;
    a two-dimensional sensor including a detection surface installed on an opposite side of the X-ray source with the sample placed therebetween and configured to detect X-rays transmitted through the sample;
    a sample moving mechanism capable of moving the sample at a predetermined speed in a predetermined direction parallel to the detection surface of the two-dimensional sensor;
    a calculation unit configured to process an image of the X-rays detected by the two-dimensional sensor; and
    a display unit capable of displaying a cross-sectional image based on the image of the X-rays processed by the calculation unit,
    wherein the two-dimensional sensor includes a plurality of pixels that are image sensing devices arranged in a lattice pattern and is capable of reading images of the X-rays detected by the plurality of pixels at once at a predetermined frame rate, and
    wherein the calculation unit creates a cross-sectional image of the sample at a position having a distance of L from the X-ray source by performing an addition process of continuously adding the images of the X-rays at an interval of $[(LS \times V1)/(L \times F \times A)]$ along the predetermined direction, where V1 is the predetermined speed at which the sample moves, F is the predetermined frame rate, A is a pixel pitch of the two-dimensional sensor, and LS is a distance between the X-ray source and the two-dimensional sensor.

2. The X-ray transmission inspection apparatus according to claim 1, wherein the calculation unit is configured to:
    create a first cross-sectional image of the sample at a position having a distance of L1 front the X-ray source and a second cross-sectional image of the sample at a position having a distance of L2 from the X-ray source,
    display the first cross-sectional image and the second cross-sectional image on the display unit,
    perform a correction process of making a display size of the first cross-sectional image L1/L2 times the first cross-sectional image, and
    display the first cross-sectional image at the display size and the second cross-sectional image on the display unit.

3. The X-ray transmission inspection apparatus according to claim 2, further comprising:
    a sample rotating mechanism capable of changing an orientation of the sample with respect to the X-ray source,
    wherein the calculation unit creates a plurality of cross-sectional images of the sample from the X-rays transmitted through the sample from different directions by changing directions of the sample by the sample rotating mechanism.

4. The X-ray transmission inspection apparatus according to claim 1, further comprising:
    a sample rotating mechanism capable of changing an orientation of the sample with respect to the X-ray source,
    wherein the calculation unit creates a plurality of cross-sectional images of the sample from the X-rays transmitted through the sample from different directions by changing directions of the sample by the sample rotating mechanism.

5. An X-ray transmission inspection method comprising:
    irradiating a sample with X-rays using an X-ray source;
    detecting the X-rays transmitted through the sample using a two-dimensional sensor including a detection surface installed on an opposite side of the X-ray source with the sample placed between the X-ray source and the two-dimensional sensor;

moving the sample at a predetermined speed in a predetermined direction parallel to the detection surface of the two-dimensional sensor;

processing an image of the X-rays detected by the two-dimensional sensor by a calculation unit; and displaying a cross-sectional image based on the image of the X-rays processed by the calculation unit on a display unit, wherein the two-dimensional sensor includes a plurality of pixels that are image sensing devices arranged in a lattice pattern and is capable of reading images of the X-rays detected by the plurality of pixels at once at a predetermined frame rate, and wherein the processing an image of the X-rays detected by the two-dimensional sensor comprises creating a cross-sectional image of the sample taken at a position having a distance of L from the X-ray source by performing an addition process of continuously adding the images of the X-rays at an interval of $[(LS \times V1)/(L \times F \times A)]$ in the predetermined direction, where V1 is the predetermined speed, F is the predetermined frame rate, A is a pixel pitch of the two-dimensional sensor, and LS is a distance between the X-ray source and the two-dimensional sensor.

6. The X-ray transmission inspection method according to claim 5, wherein the processing an image of the X-rays detected by the two-dimensional sensor comprises:

creating a first cross-sectional image of the sample at a position having a distance of L1 from the X-ray source and a second cross-sectional image of the sample at a position having a distance of L2 from the X-ray source on the display unit, performing a correction process of making a display size of the first cross-sectional image of the sample L1/L2 times the first cross-sectional image, and displaying the first cross-sectional image at the display size and the second cross-sectional image on the display unit.

7. The X-ray transmission inspection method according to claim 6, wherein the processing an image of the X-rays detected by the two-dimensional sensor comprises:

creating a plurality of cross-sectional images of the sample from the X-rays transmitted through the sample from different directions by changing an orientation of the sample with respect to the X-ray source.

8. The X-ray transmission inspection method according to claim 5, wherein the processing an image of the X-rays detected by the two-dimensional sensor comprises:

creating a plurality of cross-sectional images of the sample from the X-rays transmitted through the sample from different directions by changing an orientation of the sample with respect to the X-ray source.

* * * * *